(12) United States Patent
Banhos et al.

(10) Patent No.: US 12,044,132 B1
(45) Date of Patent: Jul. 23, 2024

(54) SEAL ARC SEGMENT WITH CMC PLY CUTOUTS FOR COOLING CHANNELS

(71) Applicant: RAYTHEON TECHNOLOGIES CORPORATION, Farmington, CT (US)

(72) Inventors: Jonas Banhos, West Hartford, CT (US); James T. Roach, Vernon, CT (US); Russell Kim, Temecula, CA (US)

(73) Assignee: RTX CORPORATION, Farmington, CT (US)

( * ) Notice: Subject to any disclaimer, the term of this patent is extended or adjusted under 35 U.S.C. 154(b) by 0 days.

(21) Appl. No.: 18/195,159

(22) Filed: May 9, 2023

(51) Int. Cl.
*F01D 11/08* (2006.01)
*F01D 25/14* (2006.01)

(52) U.S. Cl.
CPC .............. *F01D 11/08* (2013.01); *F01D 25/14* (2013.01); *F05D 2240/55* (2013.01); *F05D 2260/2214* (2013.01); *F05D 2300/6033* (2013.01)

(58) Field of Classification Search
CPC ....... F01D 11/08; F01D 25/14; F05D 2240/11
See application file for complete search history.

(56) References Cited

U.S. PATENT DOCUMENTS

| | | | |
|---|---|---|---|
| 11,174,752 B2 * | 11/2021 | Dyson | F01D 25/24 |
| 11,236,629 B2 | 2/2022 | Kusumoto et al. | |
| 11,326,470 B2 | 5/2022 | Dyson et al. | |
| 2018/0223681 A1 * | 8/2018 | Gallier | F01D 11/24 |
| 2021/0189901 A1 * | 6/2021 | Dyson | C04B 38/0615 |
| 2021/0189902 A1 * | 6/2021 | Dyson | F01D 5/282 |

* cited by examiner

*Primary Examiner* — Eldon T Brockman
(74) *Attorney, Agent, or Firm* — Carlson, Gaskey & Olds, P.C.

(57) ABSTRACT

A seal arc segment includes a wall that defines radially inner and outer sides, forward and aft ends, and first and second circumferential sides. The wall includes a CMC ply lay-up of a radially inner-most CMC ply on the inner side, a radially outer-most CMC ply on the radially outer side, and radially intermediate CMC plies therebetween. At least one of the radially intermediate CMC plies has cutout voids that define cooling channels in the wall. The cooling channels are bound on lateral channel sides by the at least one of the radially intermediate CMC plies, bound on a radially inner channel side by a first adjacent one of the CMC plies, and bound on a radially outer channel side by a second, different adjacent one of the CMC plies. The radially outer-most CMC ply includes at least one inlet hole connected to the cooling channels for providing cooling air.

11 Claims, 4 Drawing Sheets

SEAL ARC SEGMENT WITH CMC PLY CUTOUTS FOR COOLING CHANNELS

BACKGROUND

A gas turbine engine typically includes a fan section, a compressor section, a combustor section and a turbine section. Air entering the compressor section is compressed and delivered into the combustion section where it is mixed with fuel and ignited to generate a high-pressure and temperature exhaust gas flow. The high-pressure and temperature exhaust gas flow expands through the turbine section to drive the compressor and the fan section. The compressor section may include low and high pressure compressors, and the turbine section may also include low and high pressure turbines.

Airfoils in the turbine section are typically formed of a superalloy and may include thermal barrier coatings to extend temperature capability and lifetime. Ceramic matrix composite ("CMC") materials are also being considered for airfoils. Among other attractive properties, CMCs have high temperature resistance. Despite this attribute, however, there are unique challenges to implementing CMCs in airfoils.

SUMMARY

A seal arc segment according to an example of the present disclosure includes a seal arc segment wall that defines radially inner and outer sides, forward and aft ends, and first and second circumferential sides. The seal arc segment wall includes a lay-up of ceramic matrix composite (CMC) plies that span the forward and aft ends and have a radially inner-most CMC ply on the inner side, a radially outer-most CMC ply on the radially outer side, and radially intermediate CMC plies between the radially inner-most CMC ply and the radially outer-most CMC ply. At least one of the radially intermediate CMC plies has cutout voids that define cooling channels in the seal arc segment wall. The cooling channels are bound on lateral channel sides by the at least one of the radially intermediate CMC plies, bound on a radially inner channel side by a first adjacent one of the CMC plies, and bound on a radially outer channel side by a second, different adjacent one of the CMC plies. The radially outer-most CMC ply include at least one inlet hole connected to the cooling channels for providing cooling air.

In a further embodiment of the foregoing example, multiple ones of the radially intermediate CMC plies have the cutout voids such that the cooling channels form a three-dimensional cooling network.

In a further embodiment of any of the foregoing examples, two or more congruent ones of the intermediate CMC plies have the cutout voids such that the cooling channels have a thickness that is equal to two or more of the CMC plies.

In a further embodiment of any of the foregoing examples, the cooling channels have a thickness and the CMC plies each have a ply thickness, and the thickness of the cooling channels is a multiple of the ply thickness.

In a further embodiment of any of the foregoing examples, the CMC plies includes at least one outlet hole connected with the cooing channels and that opens at one of the radially inner side, the forward end, the aft end, the first circumferential side, or the second circumferential side.

In a further embodiment of any of the foregoing examples, a first group of congruent ones of the intermediate CMC plies has a first group of cooling channels that are elongated in a circumferential direction and has a first connector cooling channel that is elongated in an oblique direction such that the first connector cooling channel intersects and connects the first group of cooling channels.

In a further embodiment of any of the foregoing examples, a second, different group of congruent ones of the intermediate CMC plies has a second group of cooling channels that are elongated in the circumferential direction and has a second connector cooling channel that is elongated in an oblique direction such that the second connector cooling channel intersects and connects the second group of cooling channels.

In a further embodiment of any of the foregoing examples, the first connector cooling channel connects the first group of cooling channels to the second group of cooling channels.

In a further embodiment of any of the foregoing examples, a first group of congruent ones of the intermediate CMC plies has a first group of cooling channels that are bifurcated into first and second cooling circuits that are flow-isolated from each other.

In a further embodiment of any of the foregoing examples, the first cooling circuit includes an outlet that opens to the trailing end and the second cooling circuit includes an outlet that open to the forward end.

In a further embodiment of any of the foregoing examples, the radially outer side of the seal arc segment wall includes an attachment feature.

In a further embodiment of any of the foregoing examples, the cooling channels are parallel to each other.

A gas turbine engine according to an example of the present disclosure includes a compressor section, a combustor in fluid communication with the compressor section, and a turbine section in fluid communication with the combustor. The turbine section having a plurality of seal arc segments according to any of the foregoing examples.

A method of fabricating a seal arc segment according to an example of the present disclosure includes laying-up at least one radially inner-most ceramic fabric ply on a mandrel, laying-up the at least one discontinuous radially intermediate ceramic fabric ply on the at least one inner-most ceramic fabric ply, the at least one discontinuous radially intermediate ceramic fabric ply having cutout voids, laying-up at least one radially outer-most ceramic fabric ply on the at least one discontinuous radially intermediate ceramic fabric ply with the cutout voids, the radially inner-most ceramic fabric ply, the at least one discontinuous radially intermediate ceramic fabric ply, and the radially outer-most ceramic fabric ply together providing a seal arc segment fiber preform, and densifying the seal arc segment fiber preform with a ceramic matrix material to form a seal arc segment wall of a seal arc segment, wherein the cutout voids define cooling channels in the seal arc segment wall.

A further example of the foregoing embodiment includes cutting strips in at least one ceramic fabric ply to provide the at least one discontinuous radially intermediate ceramic fabric ply, and removing the strips from the at least one discontinuous radially intermediate ceramic fabric ply to provide the cutout voids.

The present disclosure may include any one or more of the individual features disclosed above and/or below alone or in any combination thereof.

BRIEF DESCRIPTION OF THE DRAWINGS

The various features and advantages of the present disclosure will become apparent to those skilled in the art from the following detailed description. The drawings that accompany the detailed description can be briefly described as follows.

Figure 1:
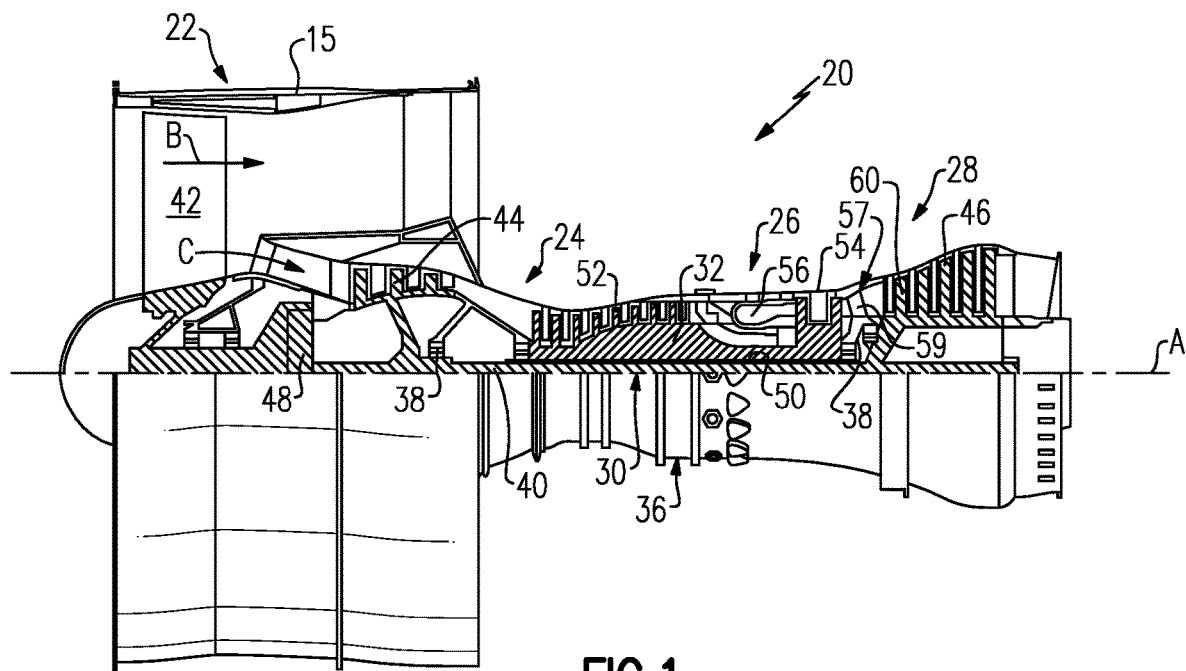
FIG. 1 illustrates a gas turbine engine.

In this disclosure, like reference numerals designate like elements where appropriate and reference numerals with the addition of one-hundred or multiples thereof designate modified elements that are understood to incorporate the same features and benefits of the corresponding elements. Terms such as "first" and "second" used herein are to differentiate that there are two architecturally distinct components or features. Furthermore, the terms "first" and "second" are interchangeable in that a first component or feature could alternatively be termed as the second component or feature, and vice versa.

DETAILED DESCRIPTION

FIG. 1 schematically illustrates a gas turbine engine 20. The gas turbine engine 20 is disclosed herein as a two-spool turbofan that generally incorporates a fan section 22, a compressor section 24, a combustor section 26 and a turbine section 28. The fan section 22 drives air along a bypass flow path B in a bypass duct defined within a housing 15 such as a fan case or nacelle, and also drives air along a core flow path C for compression and communication into the combustor section 26 then expansion through the turbine section 28. Although depicted as a two-spool turbofan gas turbine engine in the disclosed non-limiting embodiment, it should be understood that the concepts described herein are not limited to use with two-spool turbofans as the teachings may be applied to other types of turbine engines including three-spool architectures.

The exemplary engine 20 generally includes a low speed spool 30 and a high speed spool 32 mounted for rotation about an engine central longitudinal axis A relative to an engine static structure 36 via several bearing systems 38. It should be understood that various bearing systems 38 at various locations may alternatively or additionally be provided, and the location of bearing systems 38 may be varied as appropriate to the application.

The low speed spool 30 generally includes an inner shaft 40 that interconnects, a first (or low) pressure compressor 44 and a first (or low) pressure turbine 46. The inner shaft 40 is connected to the fan 42 through a speed change mechanism, which in exemplary gas turbine engine 20 is illustrated as a geared architecture 48 to drive a fan 42 at a lower speed than the low speed spool 30. The high speed spool 32 includes an outer shaft 50 that interconnects a second (or high) pressure compressor 52 and a second (or high) pressure turbine 54. A combustor 56 is arranged in the exemplary gas turbine 20 between the high pressure compressor 52 and the high pressure turbine 54. A mid-turbine frame 57 of the engine static structure 36 may be arranged generally between the high pressure turbine 54 and the low pressure turbine 46. The mid-turbine frame 57 further supports bearing systems 38 in the turbine section 28. The inner shaft 40 and the outer shaft 50 are concentric and rotate via bearing systems 38 about the engine central longitudinal axis A which is collinear with their longitudinal axes.

The core airflow is compressed by the low pressure compressor 44 then the high pressure compressor 52, mixed and burned with fuel in the combustor 56, then expanded through the high pressure turbine 54 and low pressure turbine 46. The mid-turbine frame 57 includes airfoils 59 which are in the core airflow path C. The turbines 46, 54 rotationally drive the respective low speed spool 30 and high speed spool 32 in response to the expansion. It will be appreciated that each of the positions of the fan section 22, compressor section 24, combustor section 26, turbine section 28, and fan drive gear system 48 may be varied. For example, gear system 48 may be located aft of the low pressure compressor, or aft of the combustor section 26 or even aft of turbine section 28, and fan 42 may be positioned forward or aft of the location of gear system 48.

The engine 20 in one example is a high-bypass geared aircraft engine. In a further example, the engine 20 bypass ratio is greater than about six (6), with an example embodiment being greater than about ten (10), and can be less than or equal to about 18.0, or more narrowly can be less than or equal to 16.0. The geared architecture 48 is an epicyclic gear train, such as a planetary gear system or other gear system, with a gear reduction ratio of greater than about 2.3. The gear reduction ratio may be less than or equal to 4.0. The low pressure turbine 46 has a pressure ratio that is greater than about five. The low pressure turbine pressure ratio can be less than or equal to 13.0, or more narrowly less than or equal to 12.0. In one disclosed embodiment, the engine 20 bypass ratio is greater than about ten (10:1), the fan diameter is significantly larger than that of the low pressure compressor 44, and the low pressure turbine 46 has a pressure ratio that is greater than about five 5:1. Low pressure turbine 46 pressure ratio is pressure measured prior to an inlet of low pressure turbine 46 as related to the pressure at the outlet of the low pressure turbine 46 prior to an exhaust nozzle. The geared architecture 48 may be an epicycle gear train, such as a planetary gear system or other gear system, with a gear reduction ratio of greater than about 2.3:1 and less than about 5:1. It should be understood, however, that the above parameters are only exemplary of one embodiment of a geared architecture engine and that the present invention is applicable to other gas turbine engines including direct drive turbofans.

A significant amount of thrust is provided by the bypass flow B due to the high bypass ratio. The fan section 22 of the engine 20 is designed for a particular flight condition—typically cruise at about 0.8 Mach and about 35,000 feet (10,668 meters). The flight condition of 0.8 Mach and 35,000 ft (10,668 meters), with the engine at its best fuel consumption—also known as "bucket cruise Thrust Specific Fuel Consumption ('TSFC')"- is the industry standard parameter of 1 bm of fuel being burned divided by 1 bf of thrust the engine produces at that minimum point. The engine parameters described above and those in this paragraph are measured at this condition unless otherwise specified. "Low fan pressure ratio" is the pressure ratio across the fan blade alone, without a Fan Exit Guide Vane ("FEGV") system. The low fan pressure ratio as disclosed herein according to one non-limiting embodiment is less than about 1.45, or more narrowly greater than or equal to 1.25. "Low corrected fan tip speed" is the actual fan tip speed in ft/sec divided by an industry standard temperature correction of $[(Tram\ °\ R)/(518.7°\ R)]^{0.5}$. The "Low corrected fan tip speed" as disclosed herein according to one non-limiting embodiment is less than about 1150.0 ft/second (350.5 meters/second), and can be greater than or equal to 1000.0 ft/second (304.8 meters/second).

Figure 2:
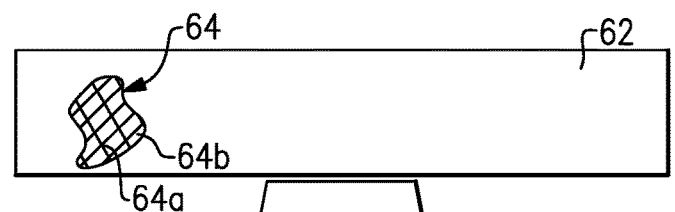
FIG. 2 illustrates a portion of the turbine section of the engine.
Figure 2:
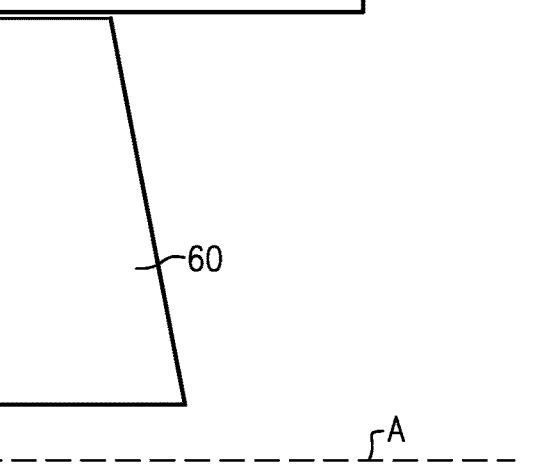
Figure 3:
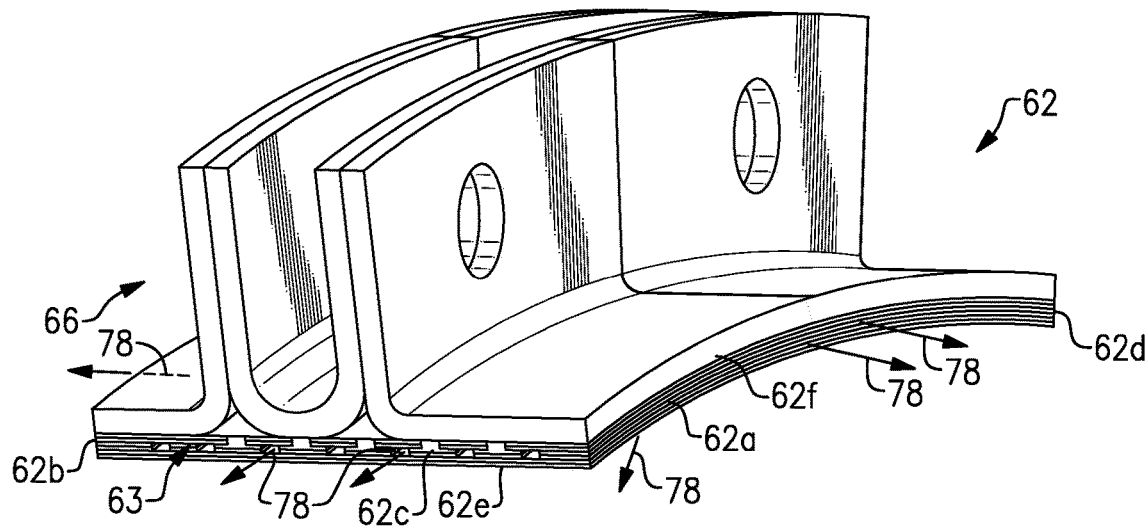
FIG. 3 illustrates a seal arc segment.

FIG. 2 illustrates a portion of the turbine section 28 with turbine blades 60 (one shown) that are rotatable about the engine axis A. Near the tips of the blades 60, there is a circumferential row of seal arc segments 62, also known as blade outer air seals. The seal arc segments 62 limit flow of combustion gases around the tips of the blades 60. A representative one of the seal arc segments 62 is shown in FIG. 3. The seal arc segment 62 is formed of a seal arc segment wall 63 that has a forward end 62a, an aft end 62b, opposed circumferential sides 62c/62d, a radially inner gaspath side 62e that faces radially inwardly toward the blades 60, and a radially outer non-gaspath side 62f that faces radially outwardly. The leading end 62a faces axially forward toward the front of the engine 20, the aft end 62b faces axially aft toward the back of the engine 20. The opposed circumferential sides 62c/62d face in a tangential direction relative to the engine axis A.

The seal arc segment 62 includes one or more attachment features 66 on the radially outer side 62f of the seal arc segment wall 63, for securing the seal arc segment 62 to a mating structure (e.g., an engine case). In the illustrated example, the attachment features 66 include axially-spaced flanges that have aligned though-holes, although it is to be appreciated that the type of attachment feature may be varied for the particular implementation. The flanges inter-fit with a mating flange of a case that also has a hole that aligns with the through-holes of the attachment feature 66 such that a lock pin can be received through the holes to thereby secure the seal arc segment 62 to the case.

The seal arc segment 62 is formed of a ceramic matrix composite (CMC) 64 (shown in partial cutaway view in FIG. 2). For example, the CMC 64 includes ceramic fiber tows 64a that are disposed in a ceramic matrix 64b. The CMC 64 may be, but is not limited to, a SiC/SiC ceramic matrix composite in which SiC fiber tows are disposed within a SiC matrix. The fiber tows are provided as a ceramic fabric and arranged in a fiber architecture in the fabric (e.g. braided or harness satin weave). As will be described in further detail later on below, the fabric is laid-up, layer-upon-layer, to provide the seal arc segment wall 63.

Figure 4:
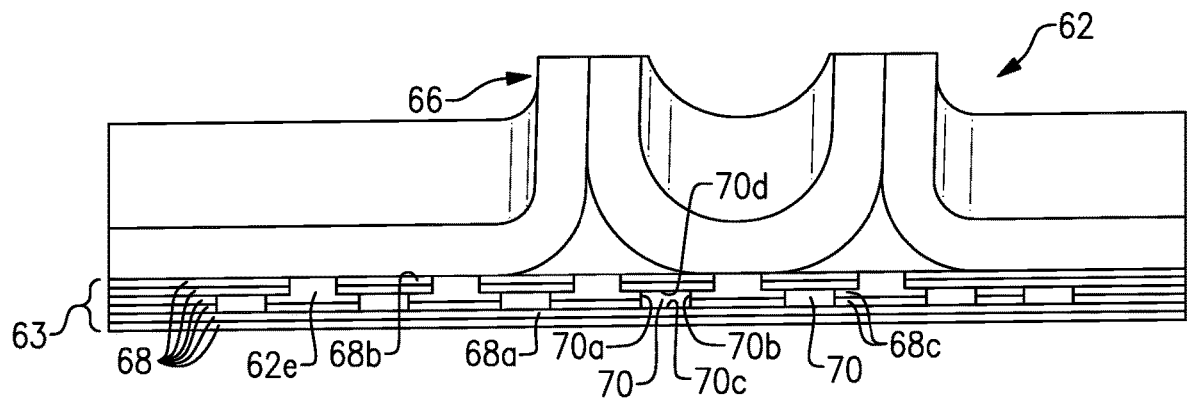
FIG. 4 illustrates a view of the CMC layers of the seal arc segment.

FIG. 4 shows a portion of the seal arc segment 62 looking at the circumferential side 62e. The seal arc segment wall 63 is formed of a lay-up of CMC plies 68 that span the forward and aft ends 62a/62b. The CMC plies 68 include at least one radially inner-most CMC ply 68a, at least one radially outer-most CMC ply 68b, and radially intermediate CMC plies 68c located between the CMC plies 68a/68b. In this example, each of the radially inner-most CMC ply 68a and the radially outer-most CMC ply 68b are double layers but could alternatively be single layers or have more than two layers. The plies 68a/68b are continuous plies in that, except for cooling through-holes, extend uninterrupted from the forward end 62a to the aft end 62b and from one circumferential side 62c to the other circumferential side 62d.

At least one of the intermediate CMC plies 68c has cutout voids 70 that serve as cooling channels in the seal arc segment wall 63. The seal arc segment 62 includes at least one inlet hole 65 (FIG. 5) connected to the cooling channels for providing cooling air thereto (e.g. compressor bleed air) for cooling the seal arc segment wall 63. Each cooling channel is bound on lateral channel sides 70a/70b by the at least one of the intermediate CMC plies 68c, bound on an inner channel side 70c by a first adjacent one of the CMC plies 68 (e.g. either another of the intermediate CMC plies 68c or the radially inner-most CMC ply 68a), and bound on an outer channel side 70d by a second, different adjacent one of the CMC plies 68 (e.g. either another of the intermediate CMC plies 68c or the radially outer-most CMC ply 68b). In the example in FIG. 4, two congruent ones of the intermediate CMC plies 68c have the cutout voids 70 such that the cooling channels have a thickness that is equal to two or more of the CMC plies 68. A thickness of two plies facilitates good flow and cooling. Alternatively, however, if cooling requirements permit, the cooling channels could have a thickness that is a different multiple of ply thicknesses, such as a thickness of one ply or more than two plies.

Figure 5:
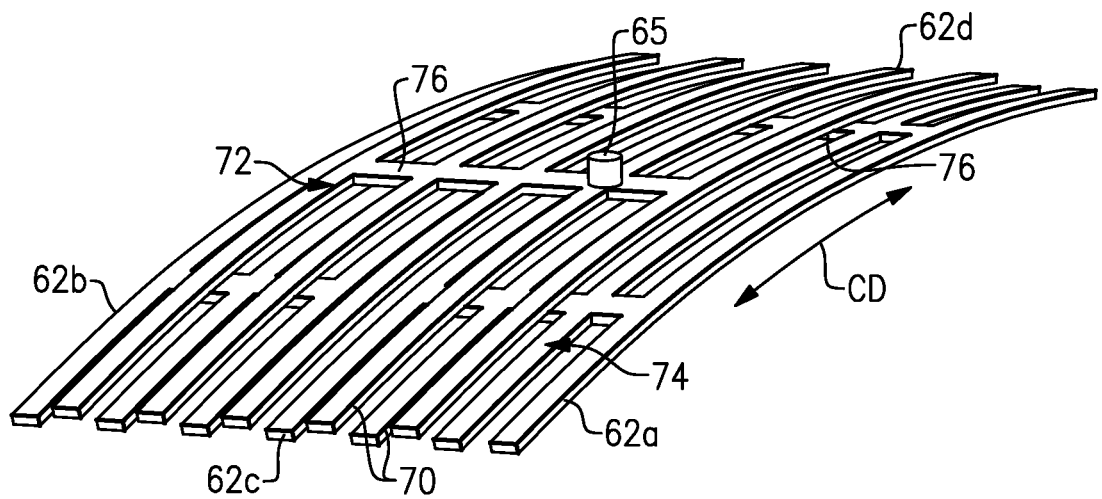
FIG. 5 illustrates the cooling channels of the seal arc segment.

FIG. 5 is a representation of the cutout voids 70 (i.e., the cooling channels) in the seal arc segment 62, without the CMC plies 68. The cooling channels in this example are substantially parallel in a circumferential direction (CD) and form a three-dimensional cooling network. It is to be appreciated, however, that the configuration, number, and spacing of the cooling channels may be tailored for cooling requirements.

In the example shown, a first group of congruent ones of the intermediate CMC plies 68c forms a first group 72 of cooling channels that are elongated in the circumferential direction (CD), and a second, different group of congruent ones of the intermediate CMC plies 68c forms a second group 74 of cooling channels that are elongated in a circumferential direction (CD). That is, the cooling channels in the first group 72 are all in the same intermediate CMC ply or plies 68c, and the cooling channels in the second group 74 are all in the same intermediate CMC ply or plies 68c (but not the same plies 68c as the channels of the first group 72). The groups 72/74 are adjacent but are axially offset in this example such that the channels of the first group 72 do not overlap, connect, or intersect with the channels of the second group 74. Each group 72/74, however, has one or more connector cooling channels 76 that are elongated in an oblique direction (here axial) such that the connector cooling channel 76 intersects and connects the channels in the respective group 72/74. However, as the groups 72/74 are adjacent, the groups 72/74 connect at the locations where the connector cooling channels 76 of one group 72 or 74 cross the circumferential channels of the other group 74 or 72. Thus, cooling air entering through the inlet 65 can flow through both groups 72/74 of channels. In this regard, the seal arc segment 62 may include one or more outlet holes 78 connected with the cooing channels and that open at one of the radially inner side 62e, the forward end 62a, the aft end 62b, or the circumferential sides 62c/62d.

Figure 6:
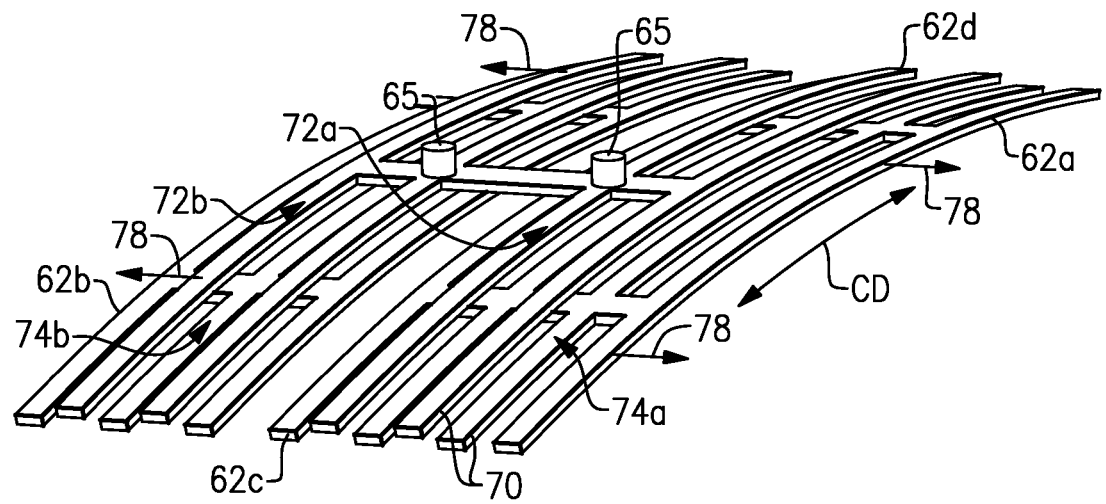
FIG. 6 illustrates another example configuration of the cooling channels.

The example in FIG. 6 is similar to that of FIG. 5, except that the groups are bifurcated into first and second cooling circuits 72a/74a and 72b/74b, with an inlet hole 65 for each circuit. The first circuit 72a/74a is flow-isolated from the second circuit 72b/74b such that once flow enters either circuit via one of the inlet holes 65 the flow cannot travel to the other circuit. As shown, the first circuit 72a/74a is situated toward the leading end 62a of the seal arc segment 62 and discharges spent cooling air through outlets 78 at the leading end 62a, and the second circuit 72b/74b is situated toward the aft end 62b of the seal arc segment and discharges spent cooling air through outlets 78 in the aft end 72b. In this manner, separate cooling air flows, such as flows of different Mach numbers, can be provided to the circuits to meet different cooling requirements. For example, one of the circuits may discharge its cooling air to an adjacent component that is either upstream or downstream of the seal arc segment 62, such as a vane structure, while the other circuit dumps its spent cooling air overboard into the core gaspath.

As will be appreciated, the cooling channels could be configured with additional flow-isolated circuits to provide additional, individually cooled regions in the seal arc segment 62.

Figure 7:
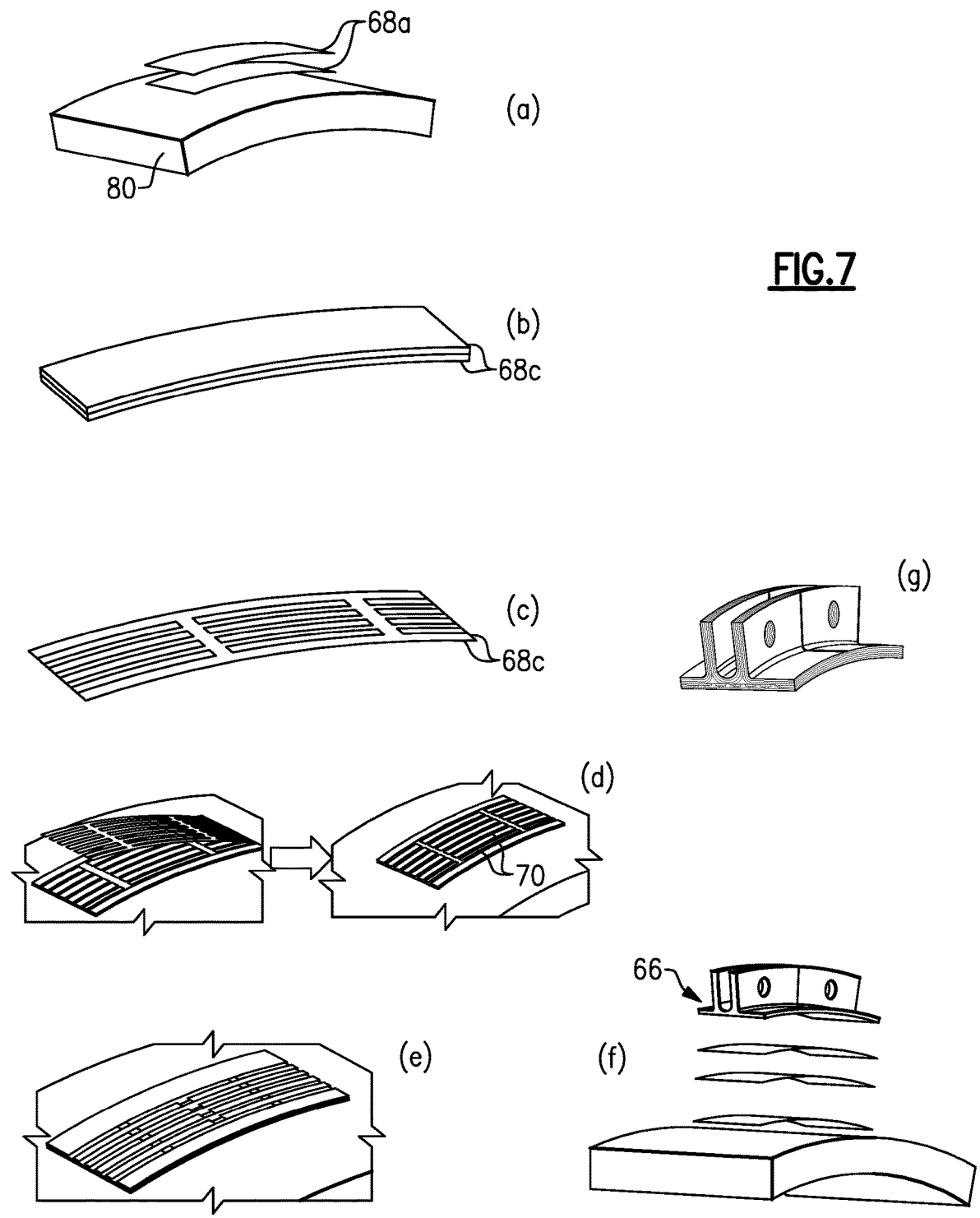
FIG. 7 illustrates fabrication of a seal arc segment.

FIG. 7 depicts an example method for fabricating the seal arc segment 62. At step (a), at least one radially inner-most ceramic fabric ply 68a is laid-up on a mandrel 80. For example, to make a double layer, two layers of ceramic fabric are arranged onto the mandrel 80. At step (b), two radially intermediate ceramic fabric plies 68c are attached back-to-back. For example, the plies may be bonded together using an adhesive, such as polyvinyl alcohol polymer. The bonding facilitates keeping the plies aligned for subsequent steps. At step (c), a pattern of strips are cut in the plies from step (b). As an example, laser-cutting may be used but other cutting techniques may alternatively be used. At step (d), the cut radially intermediate ceramic fabric plies 68c from step (c) are laid-up on the inner-most ceramic fabric ply 68a from step (a) and then the cut pattern of strips is removed from the cut intermediate ceramic fabric plies, leaving cutout voids 70. At step (e), the process steps (b), (c), and (d) are repeated to lay-up additional intermediate ceramic fabric plies and cutout voids to a desired layer thickness and configuration of cooling channels. At step (f), the attachment feature 66 is laid-up onto the aforementioned plies. The attachment features 66 may include the radially outer-most ceramic fabric ply 68b, or the ply 68b may be applied onto the aforementioned plies prior to arranging the attachment feature 66 thereon. In this manner, the ceramic fabric plies are laid-up to provide a seal arc segment fiber preform. Finally, at step (g), the fiber preform is densified with the ceramic matrix material to form the seal arc segment 62. For example, the matrix material is deposited by chemical vapor infiltration, polymer infiltration and pyrolysis, or other method of matrix formation.

Although a combination of features is shown in the illustrated examples, not all of them need to be combined to realize the benefits of various embodiments of this disclosure. In other words, a system designed according to an embodiment of this disclosure will not necessarily include all of the features shown in any one of the Figures or all of the portions schematically shown in the Figures. Moreover, selected features of one example embodiment may be combined with selected features of other example embodiments.

The preceding description is exemplary rather than limiting in nature. Variations and modifications to the disclosed examples may become apparent to those skilled in the art that do not necessarily depart from this disclosure. The scope of legal protection given to this disclosure can only be determined by studying the following claims.

What is claimed is:

1. A seal arc segment comprising:
a seal arc segment wall defining radially inner and outer sides, forward and aft ends, and first and second circumferential sides, the seal arc segment wall including a lay-up of ceramic matrix composite (CMC) plies spanning the forward and aft ends and having a radially inner-most CMC ply on the inner side, a radially outer-most CMC ply on the radially outer side, and radially intermediate CMC plies between the radially inner-most CMC ply and the radially outer-most CMC ply, at least one of the radially intermediate CMC plies having cutout voids that define cooling channels in the seal arc segment wall, the cooling channels being bound on lateral channel sides by the at least one of the radially intermediate CMC plies, bound on a radially inner channel side by a first adjacent one of the CMC plies, and bound on a radially outer channel side by a second, different adjacent one of the CMC plies, the radially outer-most CMC ply including at least one inlet hole connected to the cooling channels for providing cooling air, wherein a first group of congruent ones of the intermediate CMC plies has a first group of cooling channels that are elongated in a circumferential direction and has a first connector cooling channel that is elongated in an oblique direction such that the first connector cooling channel intersects and connects the first group of cooling channels, a second, different group of congruent ones of the intermediate CMC plies has a second group of cooling channels that are elongated in the circumferential direction and has a second connector cooling channel that is elongated in an oblique direction such that the second connector cooling channel intersects and connects the second group of cooling channels with the first group of cooling channels, and the second group of cooling channels bifurcated into first and second cooling circuits that are flow-isolated from each other.

2. The seal arc segment as recited in claim 1, wherein multiple ones of the radially intermediate CMC plies have the cutout voids such that the cooling channels form a three-dimensional cooling network.

3. The seal arc segment as recited in claim 1, wherein two or more congruent ones of the intermediate CMC plies have the cutout voids such that the cooling channels have a thickness that is equal to two or more of the CMC plies.

4. The seal arc segment as recited in claim 1, wherein the cooling channels have a thickness and the CMC plies each have a ply thickness, and the thickness of the cooling channels is a multiple of the ply thickness.

5. The seal arc segment as recited in claim 1, wherein the CMC plies includes at least one outlet hole connected with the cooing channels and that opens at one of the radially inner side, the forward end, the aft end, the first circumferential side, or the second circumferential side.

6. The seal arc segment as recited in claim 1, wherein the first connector cooling channel connects the first group of cooling channels to the second group of cooling channels.

7. The seal arc segment as recited in claim 1, wherein the first cooling circuit includes an outlet that opens to the trailing end and the second cooling circuit includes an outlet that open to the forward end.

8. The seal arc segment as recited in claim 1, wherein the radially outer side of the seal arc segment wall includes an attachment feature.

9. The seal arc segment as recited in claim 1, wherein the cooling channels are parallel to each other.

10. A gas turbine engine comprising:
a compressor section;
a combustor in fluid communication with the compressor section; and
a turbine section in fluid communication with the combustor, the turbine section having a plurality of seal arc segments, each of the seal arc segments including
a seal arc segment wall defining radially inner and outer sides, forward and aft ends, and first and second circumferential sides, the seal arc segment wall including a lay-up of ceramic matrix composite (CMC) plies spanning the forward and aft ends and having a radially inner-most CMC ply on the inner side, a radially outer-most CMC ply on the radially outer side, and radially intermediate CMC plies between the radially inner-most CMC ply and the radially outer-most CMC ply, at least one of the radially intermediate CMC plies having cutout voids that define cooling channels in the seal arc segment wall, the cooling channels being bound on lateral channel sides by the at least one of the radially intermediate CMC plies, bound on a radially inner channel side by a first adjacent one of the CMC plies, and bound on a radially outer channel side by a second, different adjacent one of the CMC plies, the radially outer-most CMC ply including at least one inlet hole connected to the cooling channels for providing cooling air, wherein a first group of congruent ones of the intermediate CMC plies has a first group of cooling channels that are elongated in a circumferential direction and has a first connector cooling channel that is elongated in an oblique direction such that the first connector cooling channel intersects and connects the first group of cooling channels, a second, different group of congruent ones of the intermediate CMC plies has a second group of cooling channels that are elongated in the circumferential direction and has a second connector cooling channel that is elongated in an oblique direction such that the second connector cooling channel intersects and connects the second group of cooling channels with the first group of cooling channels, and the second group of cooling channels bifurcated into first and second cooling circuits that are flow-isolated from each other.

11. The seal arc segment as recited in claim 1, wherein the first circuit is situated toward the leading end of the seal arc segment and includes one or more first circuit outlets that open at the leading end, and the second circuit is situated toward the aft end of the seal arc segment and includes one or more second circuit outlets that open at the aft end.

* * * * *